United States Patent

[11] 3,601,627

[72] Inventor Robert K. Booher
Mission Viejo, Calif.
[21] Appl. No. 54,113
[22] Filed July 13, 1970
[45] Patented Aug. 24, 1971
[73] Assignee North American Rockwell Corporation
Continuation of application Ser. No. 523,769, Jan. 28, 1966, now Patent No. 3,526,783, dated Sept. 1, 1970.

[54] MULTIPLE PHASE LOGIC GATES FOR SHIFT REGISTER STAGES
10 Claims, 6 Drawing Figs.

[52] U.S. Cl. .......... 307/205, 307/208, 307/213, 307/221 C, 307/218, 307/279
[51] Int. Cl. .......... H03k 19/08
[50] Field of Search .......... 307/205, 221, 251, 279, 108, 213, 218

[56] References Cited
UNITED STATES PATENTS
3,252,009 5/1966 Weimer .......... 307/221
3,267,295 8/1966 Zuk .......... 307/205
3,461,312 8/1969 Farber et al. .......... 307/221

*Primary Examiner*—John S. Heyman
*Attorneys*—L. Lee Humphries, H. Frederick Hamann and Robert G. Rogers ABSTRACT: Logic gates having an isolation transistor connected to a common point between a load transistor and a two terminal logical network are combined at least partially with logic gates having the output connected to a common point between the load and isolation transistors for forming shift register stages.

INVENTOR
ROBERT K. BOOHER
BY
Robert G. Rogers
ATTORNEY

INVENTOR
ROBERT K. BOOHER
BY Robert G. Rogers
ATTORNEY

INVENTOR
ROBERT K. BOOHER
BY Robert G. Rogers
ATTORNEY

INVENTOR
ROBERT K. BOOHER
BY Robert G. Rogers
ATTORNEY

INVENTOR
ROBERT K. BOOHER
BY
Robert G Rogers
ATTORNEY

MULTIPLE PHASE LOGIC GATES FOR SHIFT REGISTER STAGES

CROSS-REFERENCE TO RELATED PATENT

Multiphase Gate Usable in Multiple Phase Gating Systems, U.S. Pat. No. 3,526,783, filed Jan. 28, 1966, issued Sept. 1, 1970 by Robert K. Booher. The present application is a continuation of said prior application 523,769, and is entitled to the Jan. 28, 1966 filing date thereof.

The insulated gate field effect transistors or metal oxide semiconductor transistors, as they are often designated, as well as recently developing devices, are well suited for the mechanization of complex logic functions on a single substrate or die. The field effect transistors have an advantage over the other semiconductor devices for such uses due to their extremely small size, lower power requirement and because of the simple process for producing large quantities in a relatively short time.

However, such devices, particularly the field effect transistors, have an inherent dynamic resistance that places certain limitations on their use, for example, in gating systems. Their resistence must be carefully considered in designing a system. Often, the resistance restricts the use of many logical configurations and may result in slow response time when they are used. In other circuit configurations, larger devices used to overcome the resistance limitation hamper circuit design and fabrication. In addition to slowing system response, the power dissipation is relatively high.

SUMMARY OF THE INVENTION

Briefly the invention comprises multiple phase logic gates operated in a ratioless manner and connected together to form shift register stages. Two types of logic gates are involved. For purposes of this description, the logic gates are identified as Type I and Type II logic gates. A Type I logic gate comprises a two terminal logical network comprising at least one field effect transistor having a control electrode. A signal is applied to the control electrode to control the impedance of an electrical path from one terminal to the other. A first terminal of the two terminal logical network is connected to a voltage level through an isolation field effect transistor and a load field effect transistor.

The output from the logic gate is connected to a common point between the load and isolation field effect transistors. The load and isolation field effect transistors are both operable to conduct electrical current therethrough to the first terminal of the logical network and to the output so that the voltage level is simultaneously applied to the first terminal and to the output during a first phase recurring clock signal. The load field effect transistor is operable only during the first phase recurring clock signal.

At least during a second phase recurring clock signal, a different voltage level is applied to the second terminal of the logical network and the isolation field effect transistor is operable to conduct electrical current therethrough so that the first terminal of the logical network is connected to the output during said second phase recurring clock signal. Therefore, if a relatively low impedance electrical path exists between the first and second terminals of the logical network, the output, to which the voltage level was previously applied, is connected to the different voltage level. In other words, the output changes from one voltage level to a different voltage level during the second phase recurring clock signal if a relatively low impedance path exists through the logical network. Thereafter the output is isolated and can be used as an input to logic networks of other logic gates having compatible clocking sequences.

A Type II logic gate also includes a two terminal logical network comprising at least one field effect transistor having a control electrode to which is applied a signal for determining the impedance of an electrical path from one terminal to the other. The first terminal is connected to a voltage level through a load field effect transistor which is operable to conduct electrical current therethrough only during a first phase recurring clock signal. An isolation field effect transistor is connected to a common point between the load field effect transistor and the first terminal of the logical network. The isolation field effect transistor is operable to conduct electrical current therethrough during the first phase recurring clock signal for applying the voltage level to the output.

At least during a second phase recurring clock signal, a different voltage level is applied to the second terminal of the logical network and the isolation field effect transistor is operable to conduct electrical current therethrough during the second phase recurring clock signal so that the first terminal of the logical network is connected to the output during the second phase recurring clock signal. If a relatively low impedance path exists between the first and second terminals, the output is connected to the different voltage level.

In various shift register embodiments, a Type I logic gate may be combined with a second Type I logic gate to form one stage of a shift register. The bottom terminals of the logic networks may or may not be connected to a clock signal to prevent excessive power dissipation during the output and the logic network precharge interval. In other embodiments, two Type II logic gates may be combined. In addition, various combinations of Type I and Type II logic gates may be combined to form other shift register embodiments. For example, the output of a Type II logic gate may be used as an input to the logic network of a Type I logic gate; or the output of a Type I logic gate may be used as an input to a logic network of a Type II logic gate. Various logic gate embodiments, derived from combinations of Type I and/or Type II logic gates are described in more detail subsequently.

During a first phase time of the operation of a logic gate, i.e. the precharge interval, a voltage level is applied to the first terminal of the logic network and to the output. The output capacitor is charged to the voltage level and the inherent capacitance of the logic network, which is electrically connected to the first terminal is also precharged. During a second phase time, i.e. the input evaluation phase, the output is connected to the first terminal through the isolation field effect transistor. If a relatively low impedance electrical path exists through the logical network by virtue of input signals on control electrodes of field effect transistors comprising the logical network, the second terminal of the logical network is also connected to the output. As indicated above, the second terminal is at a different voltage level during the second phase time so that the voltage level on the output capacitor is changed to the second voltage level during the second phase time of the circuit's operation if an electrical path exists to the logical network. Therefore, if the logical network is True during the input evaluation phase the output is changed from a first voltage level to the second voltage level on the second terminal of the logical network. If the logical network is false such that a relatively low impedance electrical path does not exist through the logical network (between terminals) the output does not change from one voltage level to the second voltage level.

After the input evaluation phase, the output is isolated so that it can be used as an input to other logic gates. For example, if a Type I logic gate utilizes $\Phi_1$ and $\Phi_2$ as precharge and input evaluation intervals respectively, during $\Phi_3$ and $\Phi_4$, the output can be utilized by other logic gates of a shift register using $\Phi_3$ or $\Phi_4$ as input evaluation phases.

Therefore, it is an object of this invention to provide multiple phase logic gates implemented by field effect transistors in various shift register embodiments.

It is still another object of this invention to provide a shift register comprised of either the same or different types of logic gates as identified by the position of an isolation field effect transistor.

A still further object of this invention is to provide multiple phase logic gates using field effect transistors for implementing selected parts of a shift register stage.

A still further object of this invention is to provide a four phase shift register using logic gates implemented by field effect transistors and implemented by various combinations of logic gates in which a bottom terminal of a logical network may or may not be clocked to achieve a change in an output voltage level during the input evaluation interval.

These and other objects of this invention will become more apparent when taken in connection with the description of drawings, a brief description of which follows.

DESCRIPTION OF PREFERRED EMBODIMENTS

Figure 1:
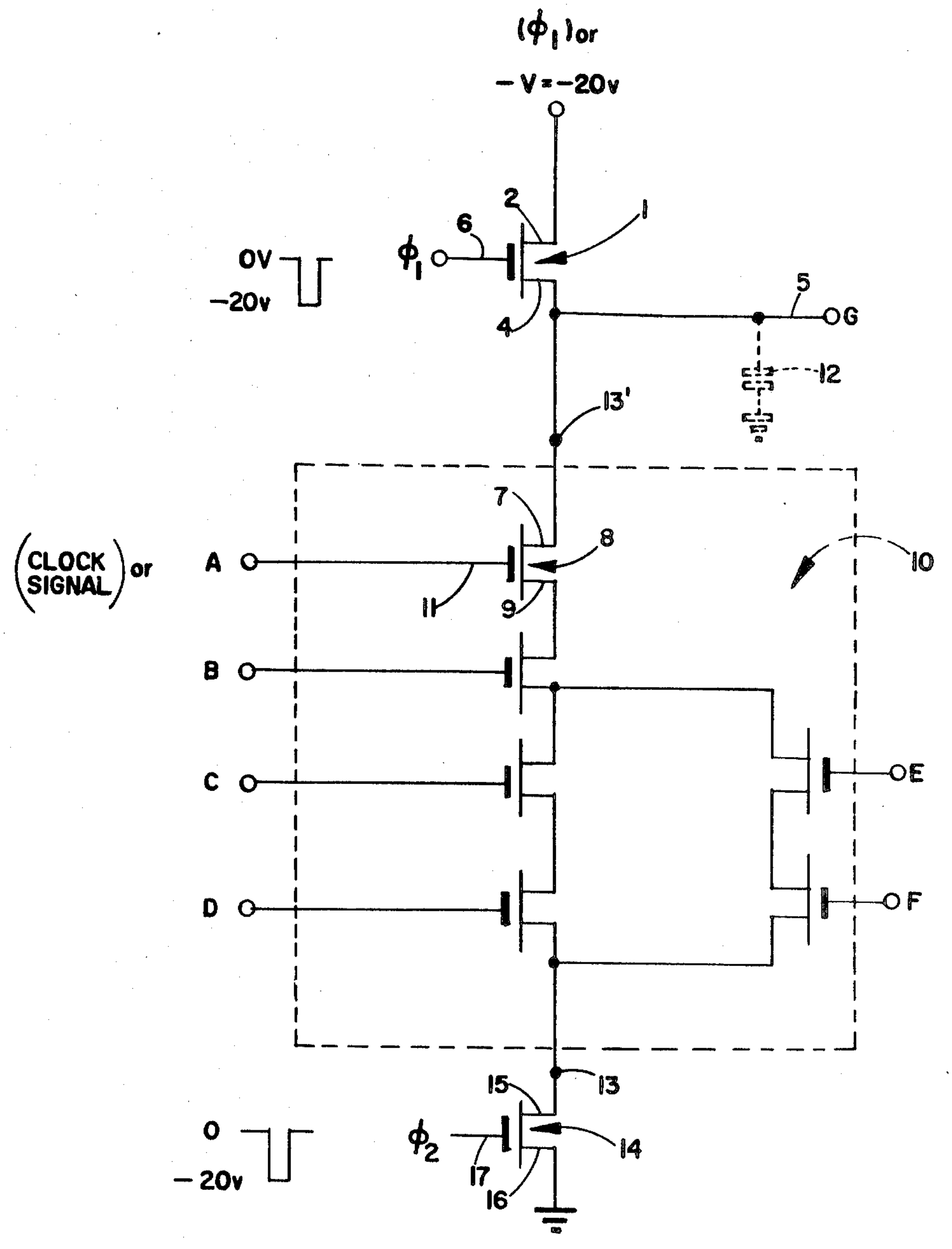
FIG. 1 is a schematic diagram of one embodiment of a multiple phase logic gate in which the bottom terminal of the logical network is isolated from electrical ground. The diagram also indicates that one field effect transistor of the logic network can be clocked.

Referring now to FIG. 1 there is shown a simple two phase gating system comprising a field effect transistor 1 having a drain electrode 2 connected to an energy source 3, such as source of fixed voltage, a source electrode 4 connected to an output 5, and a gate electrode 6 connected to receive a signal $\Phi_1$, which is a recurring clock or gating signal having a true and a false interval. During the true interval of $\Phi_1$, the source potential at 3 appears at output 5 and sets the output to that level. Although the level is shown as a constant −V or −20 volts, it could be a changing signal such as $\Phi_1$. In other embodiments, $\Phi_1$ may be connected to 3.

In the embodiment shown in FIG. 1, it is believed that the conductor connected to output 5 creates stray capacitance In addition, the field effect devices have an amount of interelectrode capacitance. All these capacitances are lumped together and shown as a discrete capacitor 12 connected from output 5 to ground. Capacitor stores the potential appearing at output 5 until it is reset. An actual (discrete) capacitor may, of course, be connected as capacitor 12.

The output means comprises output 5 and such capacitance. Output 5 is connected to a drain electrode 7 of a field effect transistor 8. Source electrode 9 of transistor 8 of is connected to other field effect devices shown as comprising a field effect device having an input *B* in series with each of two series of devices, the first series of which having inputs *C* and *D* and the second series of which having inputs *E* and F. Field effect transistor 8 includes a gate electrode 11 which is shown as having an input *A*. The total combination of field effect devices having inputs *A* through *F* may be described as a logic function 10 having two terminals, 13 and 13'. The devices mechanize the logic equation $$G=\overline{AB(CD+EF)}$$

at output 5.

Logic function 10 has a reset input terminal 13 connected to the drain electrode of a field effect transistor 14, the source electrode of which is connected to ground and the gate electrode of which is connected to receive a signal $\Phi_2$, which is a recurring clock or gating signal having a true and a false interval. It should be understood that clock $\Phi_2$ must be true, −20 v. in order to gate the logic function.

In operation, when $\Phi_1$ becomes true, transistor 1 conducts and capacitor 12 is charged toward −V potential. Subsequently, when $\Phi_2$ becomes true; output 5 is subject to being reset to ground level through logic function 10 and transistor 14 having $\Phi_2$ as input depending on the state of *A*–*F* inputs. For example, if either *C* and *D* or *E* and *F* are true and *A* and *B* are true, when clock $\Phi_2$ is true, capacitor 12 is discharged or reset to ground. Stated alternately, the input signals *A* through *F* on the control electrodes of the field effect transistors comprising the logic function 10, determine the existence of an electrical path from the output terminal 5 to terminal 13 of the logic function. When capacitor 12 is subject to being reset, $\Phi_1$ is false and transistor 1 is cutoff or nonconductive. If *C* or *D* are false and *E* or *F* are false or *A* or *B* are false, then the output remains charged toward −V. It should be obvious; therefore, that the input signals *A* through *F* have two levels representing the true and false logic states. Since the output is reset conditionally, instead of unconditionally, as a function of the state of the input signals, it should also be obvious that the signal levels do not necessarily occur in successive order.

In some cases, it is necessary to isolate the output from the logic function and to precondition certain of the transistors comprising the logic function. If such a requirement is present, it may be desirable to convert transistor 8 into an isolation transistor with input *A* comprised of the logical "or" of clock signals $\Phi_1$ and $\Phi_2$. $\Phi_1$ or $\Phi_2$ may be mechanized by an "or" gate (not shown), In that case, $\Phi_1$ would comprise one phase recurring clock signal and $\Phi_3$ a second phase recurring clock signal. Obviously, the $\Phi_{1+2}$ clock signal has a true period (phase) which is twice as large as the $\Phi_1$ clock signal.

By using transistor 8 as an isolation transistor, output 5 is isolated from the remainder of the logic function when $\Phi_1$ and $\Phi_2$ are false. The output will not be subject to change during that period and can therefore be used as an input to a subsequent gate.

During the time $\Phi_1$ is true, and transistor 1 conducts to charge capacitor 12, transistor 8 is also on and its effective capacitor (not shown) will also be charged toward −V. In addition, if any of the transistors were previously conducting, their effective capacitor could have been charged to ground and should be charged toward −V. Of course, the charge on any of the devices is only of concern if a leakage path to the output capacitor 12 could occur. Otherwise, the output level on capacitor 12 could be reduced and might prevent its effective use as an input potential to a subsequent stage.

Figure 2:
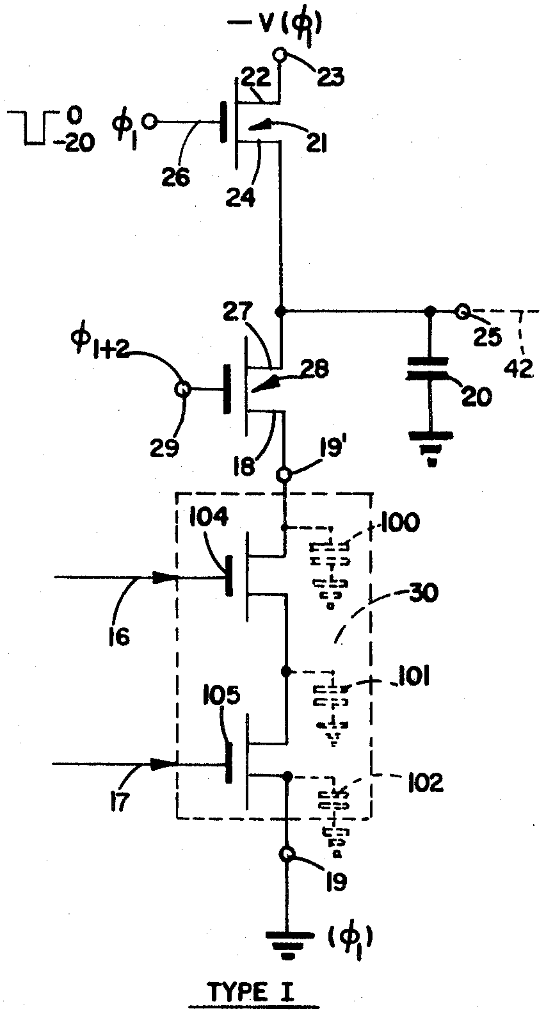
FIG. 2 is a schematic diagram of a multiple phase logic gate identified as a Type I logic gate for use in a shift register.

A more specific example is shown in FIG. 2. During a first phase time ($\Phi_1$—true) MOS device 21 turns on and a voltage, approximately −V, is supplied to output terminal 25 to charge the inherent stray capacitance represented by capacitor 20. At the same time, since the $\Phi_{1+2}$ signal is also true, MOS device 28 is turned on so that the stray inherent capacitances associated with the electrodes of the MOS devices forming logic function 30 are also charged. That is, assuming that certain of the MOS devices are turned on, which could be the case.

FIG. 2 shows the inherent stray electrode capacitances of MOS devices 104 and 105 comprising logic function 30. If MOS device 104, for example, is turned on during $\Phi_1$ time, the inherent stray capacitances 100 and 101 would be charged.

During $\Phi_2$ time, which is a continuation of the $\Phi_{1+2}$ time, MOS device 21 turns off and the logic function implemented by MOS devices 104 and 105 is evaluated. If only one of the devices, for example device 104, is turned on during $\Phi_2$ time, then capacitor 20 would not discharge during $\Phi_2$ time. However, it is pointed out that if the inherent stray capacitances 100 and 101 had not been charged (precharged) during $\Phi_1$ time, that is, if device 28 did not have a true input on electrode 29 during $\Phi_1$ time, then the charge on capacitor 20 would have been used to charge the stray capacitances 100 and 101 during $\Phi_2$ time. If that had occurred, less voltage would have been available at output terminal 25 for providing a true voltage level to inputs such as input 32 of logic function 41 shown in FIG. 3. It is for that reason that it is important to always precharge the inherent stray capacitances of the MOS devices comprising a logic function.

Referring now to FIG. 2, there is shown a simple two phase gating system comprising a first gating device illustrated as a field effect transistor 21 having a drain electrode 22 connected to an energy source 23, such as a fixed voltage –V, a source electrode 24 connected to an output 25, and a gate electrode 26 connected to receive a signal $\Phi_1$, which is a recurring clock or gating signal having a true and a false interval. In a particular embodiment, energy source 23 may be connected to signal $\Phi_1$. During the true interval of $\Phi_1$, the potential at 23 appears at the output and sets the output to the level of the potential at 23. The capacitances are lumped together and shown as a discrete capacitor 20 (shown in dotted lines) connected from output 25 to ground. Capacitor 20 stores the potential appearing at the output until it is reset. An actual (discrete) capacitor may, of course, be connected as is capacitance 20.

The output means comprises output 25 and such capacitance. Output 25 is connected to a drain electrode 27 of a field effect transistor 28. Source electrode 18 of transistor 28 is connected to a logic function 30 (terminals 19 and 19') which is shown as comprising a series of AND gates although the logic configuration could be any simple or complex logic mechanization. Field effect transistor 28 includes a gate electrode 29 which is connected to a signal comprising the logical "or" of $\Phi_1$ or $\Phi_2$. A logic gate (not shown), such as an OR gate, may be used to gate $\Phi_1$ or $\Phi_2$ to electrode 29 when either is true. For the embodiment shown, $\Phi_2$ is true after $\Phi_1$ is true for an interval.

The inputs to the gating system comprises inputs 16 and 17 although the specific number is not intended to be a limitation. There may be one or as many inputs as the logic mechanization requires.

Logic function 30 is shown as including an input terminal 19 connected to ground. However, the input terminal may be connected to a source of electrical energy such that at one interval, such as when $\Phi_1$ is false, the energy level is electrical ground, or false. Input 19 is used to achieve reset of capacitor 20.

In operation, during the first interval when $\Phi_1$ is true (–20 volts), output 25 is unconditionally set toward the level of –V (that is, capacitor 20 is charged toward –20 volts) without regard to the inputs to logic function 30. In addition, the inherent capacitance of the field effect transistors comprising logic function 30 is charged since field effect transistor 28 is turned on and –V is applied to terminal 19' during $\Phi_1$. The term "logic function" may be used interchangeably with the term "logic network." As indicated above, when the bottom terminal 19 is clocked as with the $\Phi_1$ signal, approximately the same voltage level is applied to both terminals of the logic function 30 during $\Phi_1$ so that the logic is charged and unnecessary power dissipation is prevented in those instances where an electronic path exists between the terminals. In order for the logic function to provide a discharge path for the output capacitance during the nonoverlapping portion of the $\Phi_{1+2}$ clock signal, for example the $\Phi_2$ true interval, the bottom terminal 19 is connected to a new or different voltage level. In one embodiment where the bottom terminal is not connected to a clock signal, it may always be connected to ground. In such instances, a ground potential provides the different voltage level. It is clear that the ground connection exists at least during the second recurring clock signal, $\Phi_2$, although it may exist at other times. In other embodiments, other means may be provided to insure a change in voltage levels during the two phase recurring clock signals. Subsequently, $\Phi_1$ becomes false and cuts transistor 21 off. $\Phi_2$ is true when $\Phi_1$ is false and depending on the inputs to logic function 30, output capacitor 20 is unchanged (allowed to remain "true") or if the logic permits, it is charged to the ground level (which indicates "false") appearing at point 19. Capacitor 20 is thereby conditionally reset false as a function of the true condition of the inputs to logic function 30. Thus, it is noted (as previously mentioned) the system has a logical inversion at this point. The capacitor 20 is discharged to false if the logic function inputs as shown are true and the capacitor remains charged to true if the inputs are false. Stated alternately, the field effect transistors 104 and 105 implement the logic function 30 which has a logic state (true or false) determined by the levels of the input signals 16 and 17. Each of the input signals have at least two signal levels which do not necessarily occur in successive order. It is pointed out that the clock signals $\Phi_1$ and $\Phi_2$ occur unconditionally during each operating cycle. The input signals 16 and 17 have true or false levels which occur independently of the clock signals.

If the input signal levels are true (negative for the embodiment shown), during $\Phi_2$ time, the output 25 is connected to terminal 19. By monitoring the output 25, it can therefore be determined that the inputs to the MOS devices comprising the logic function were true during $\Phi_2$ time.

For the AND gate embodiment shown in FIG. 2, in order to gate the resetting signal or level to output 25, the inputs (16, 17) must all have been true when $\Phi_2$ was true. At other intervals, except when $\Phi_1$ and $\Phi_2$ are true, the signal appearing at gate electrode 29 is false and transistor 28 is cutoff, thereby isolating output 25 from inputs 16 and 17. The isolation is important since the inputs to the logic function may be changing. If output 25 is being used as an input to a subsequent stage and there is no isolation, the output value may change and interfere with gating of the subsequent stage.

Figure 3:
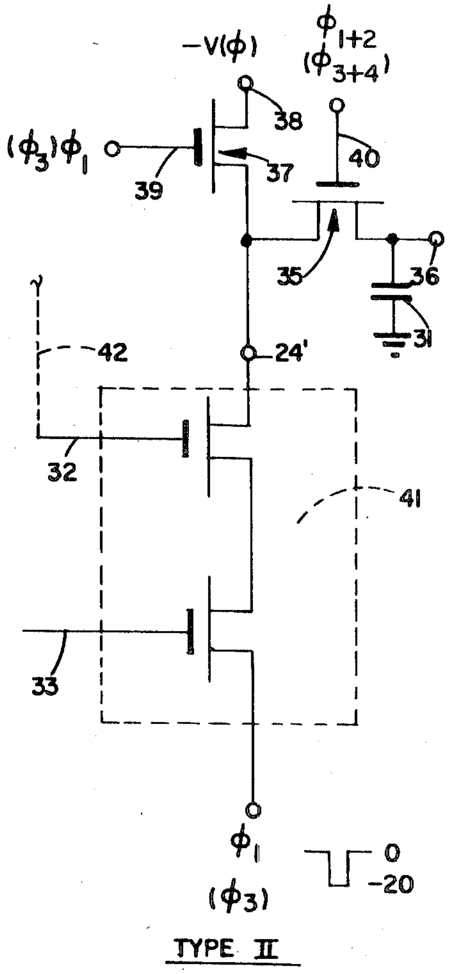
FIG. 3 is a schematic diagram of a multiple phase logic gate, identified as a Type II logic gate for use in a shift register. Dashed lines also indicate how the logic gate (Type I and Type II) can be combined to implement a shift register stage.

The FIG. 3 embodiment is substantially the same as the FIG. 2 embodiment except that an isolation transistor 35 is connected between the output 36 the source electrode of transistor 37. Logic function 41 is connected to the source electrode of transistor 37 and to one electrode of transistor 35. Transistor 35 is used in a bidirectional manner. The other electrode of transistor 35 is connected to the output. The resetting input is shown as point 34 connected to $\Phi_1$ instead of ground as shown in FIG. 2.

The system operates substantially the same as the FIG. 2 embodiment. The output is set by charging the effective capacitor 31 true during a first interval. In addition, the logic function 41 is connected to –V so that its inherent capacitance is also charged during the $\Phi_1$ clock signal. During a second clock signal $\Phi_2$, or interval, depending on the logic function 41, the signal appearing at point 34, which is ground during this interval, is gated to the output to reset the capacitor. During other intervals, the output is isolated from the logic function inputs.

In the event a simple shift register stage is desired and if $\Phi_1$ and $\Phi_2$ of the FIG. 3 embodiment are changed to $\Phi_3$ and $\Phi_4$, respectively, output 25 of the FIG. 2 gate may be connected as input 32 of the FIG. 3 gate. $\Phi_3$ becomes true after $\Phi_2$ and $\Phi_4$ is true after $\Phi_3$ is true and before $\Phi_1$ is true. $\Phi_3$ and $\Phi_4$ are shown in parentheses for convenience. Output 25 is isolated from logic 30 during $\Phi_3$ and $\Phi_4$ are true. $\Phi_3$ and $\Phi_4$ may be used satisfactorily as an input to logic 41. If output 25 is true when $\Phi_4$ and input 33 are true, the signal level appearing at 34 is gated to the output 36 to charge the capacitor to that level. Since $\Phi_3$ (substituted for $\Phi_1$) is used, it would be ground or 0 volts during $\Phi_4$ true time and capacitor 31 would be charged to 0 volts.

It should be appreciated that in a preferred embodiment, the stages of a shift register have their isolation transistors connected identically in the circuit and not differently, as shown in FIGS. 2 and 3.

Figure 4:
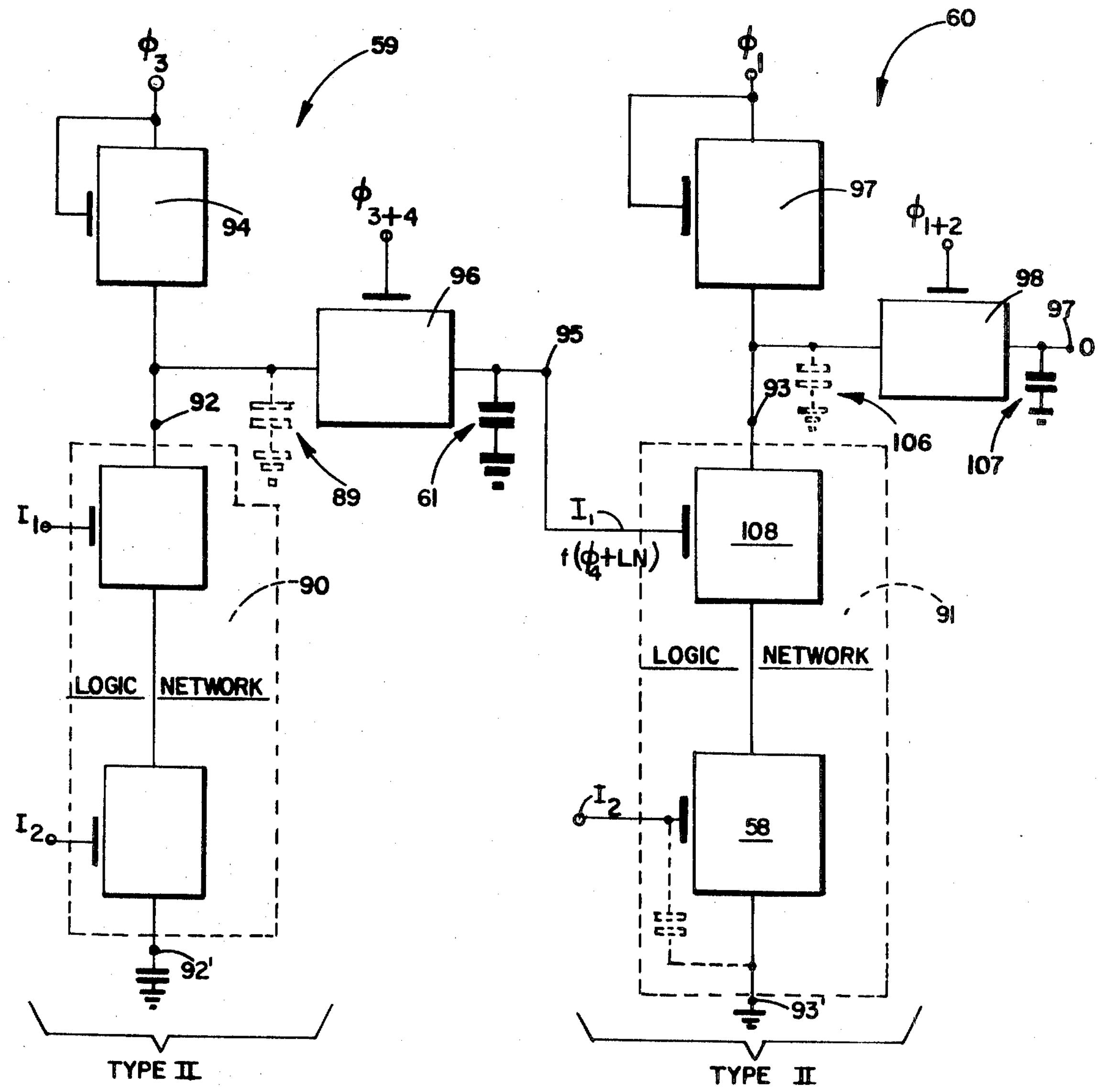
FIG. 4 is a partial schematic diagram of two Type II logic gates implementing a shift register stage showing the field effect transistors in block form.

FIG. 4 is a schematic diagram of one stage of a shift register comprising two Type II logic gates. The logic gates are identified by the numerals 59 and 60.

The logic networks 90 and 91 for the logic gates 59 and 60 are illustrated as comprising two field effect transistors connected in series. The field effect transistors of logic network 90 are connected in series between terminals 92 and 92'. Terminal 92' is connected to electrical ground. It should be understood that the terminal could also be connected to clock signal $\Phi_3$. The field effect transistors, 108 and 58, of logic network 91 are also connected in electrical series between terminals 93 and 93'. Terminal 93' may also be connected to clock signal $\Phi_1$.

In operation, the load field effect transistor 94 becomes conductive during $\Phi_3$ i.e. when the $\Phi_3$ clock signal is true, for setting the output terminal 95 to the voltage level of $\Phi_3$ through the isolation field effect transistor 96. The voltage level at the output terminal is actually reduced by the threshold voltage loss through the field effect transistor 94. The capacitors at the various nodes in the circuit are represented by the dashed capacitors 89 and 61 for logic gate 59 and dashed capacitors 106 and 107 for logic gate 60. The capacitors are charged during the precharge interval i.e., when $\Phi_3$ is true for logic gate 59 and when $\Phi_1$ is true for logic gate 60. The capacitors 89 and 106 represent the inherent capacitance at the upper terminals of the logical networks i.e. terminals 92 and 93 for the logic gates 59 and 60 respectively.

During $\Phi_4$ when the $\Phi_4$ clock signal is true, isolation transistor 96 remains on for permitting the inputs $I_1$ and $I_2$, of logic network 90 to be evaluated. If the inputs, are true, a relatively low impedance path exists between terminals 92 and 92'. As a result, the voltage at the output 95 stored on capacitor 61 is discharged to the electrical ground voltage level on terminal 92'. In other words, if the logic network 90 is true, the output 95 is discharged to a voltage level representing a false logic state. However, if logic network is false, i.e. where either input $I_1$ or $I_2$ is false the electrical impedance between terminals 92 and 92' remains relatively high so that the voltage level on capacitor 61 is not changed and the output remains at a true state.

It is pointed out that if the inherent capacitance 89 at terminal 92 of logic network 90 had not been precharged during $\Phi_3$, it would have been possible during the $\Phi_4$ phase time for the charge on capacitor 61, implemented by either a discrete capacitor and/or inherent capacitance, to have been partially used to charge capacitance 89. In other words, charge splitting could have occurred for reducing the voltage level at output 95. It would have been possible therefore for the output voltage level to change from a voltage level representing a true state to a voltage level representing a false state. The precharging of the capacitance 89 at terminal 92 prevented charge splitting during the input evaluation phase.

It should be obvious that the input $I_1$ to the logic network 91 (*LN*91) of logic gate 60 changes as a function of the $\Phi_4$ clock and the logic state of the logic network 90 (*LN*90). In FIG. 8, that relationship is identified as, $$I_1(LN91)=f(\Phi_4+LN90).$$

In effect, the field effect transistor 108 of logic network 91 is clocked at least partially by the $\Phi_4$ clock phase controlling the conduction of isolation transistor 96 of the logic gate 59. If $I_1$ and $I_2$ are clocked for example by timing pulses or by clock signals, the voltage level at output 95 would appear to be a clock signal. As a result, greater design flexibility is provided for logic gate 60. The other input $I_2$ to logic network 91 can be evaluated or not depending on the presence or absence of the clock signal at output 95. FIG. 1 gives an example of a field effect transistor in the logic network being clocked.

The logic gate 60 operates substantially the same as logic gate 59. During $\Phi_1$, the output 99 is precharged. Simultaneously the capacitance 106 and capacitor 107 are also precharged. During $\Phi_2$, the inputs $I_1$ and $I_2$ of logic network 91 are evaluated so that the voltage level on capacitor 107 is either discharged to electrical ground at terminal 93' when the logic network 91 is true or its unchanged when the logic network 91 is false.

Figure 5:
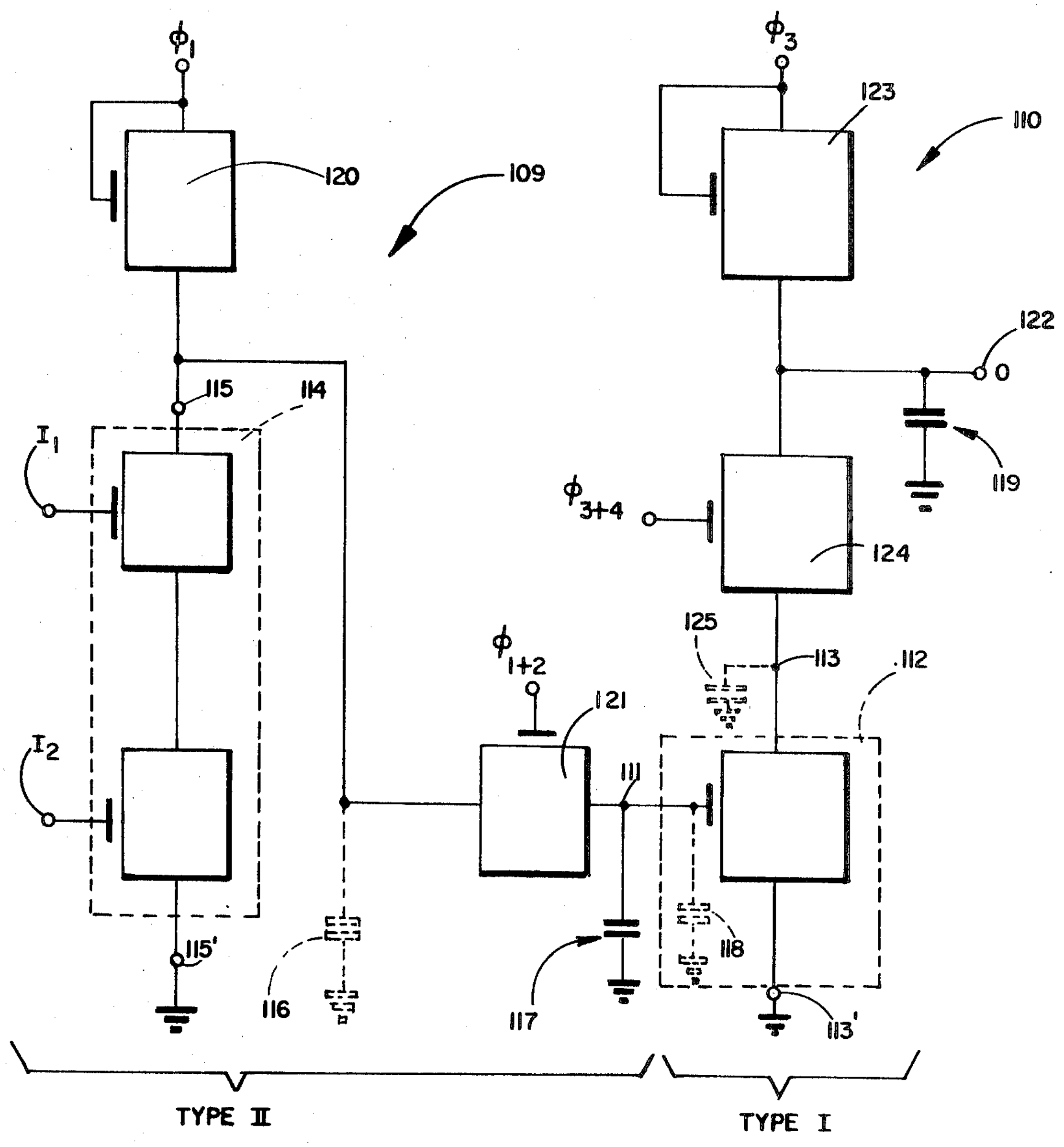
FIG. 5 is a partial schematic diagram of a Type II logic gate combined with a Type I logic gate implementing a shift register stage showing the field effect transistors in block form.

FIG. 5 is a schematic diagram of one stage of a shift register comprising a Type II logic gate identified by numeral 109 and a Type I logic gate identified by numeral 110. The output 111 from logic gate 109 provides an input to the logic network 112 of logic gate 110. For convenience, logic gate 112 is shown as being comprised of a single field effect transistor only. The terminals of the logic network 112 are identified by numerals 113 and 113'. The logic network 114 of logic gate 109 comprises two field effect transistors connected in electrical series between terminals 115 and 115'. Capacitances 116 and 118 represent node capacitances and capacitors 117 and 119 represent output capacitors as shown.

The operation of the FIG. 5 embodiment is substantially the same as the operation described for the FIG. 4 embodiment. During $\Phi_1$, the load field effect transistor 120 is turned on to charge the capacitor 117 at output 11 through the isolation field effect transistor 121. During $\Phi_2$, the logic network 114 is evaluated so that the output either remains at a true voltage level or is discharged to a false voltage level as a function of the logic state of the logic network 114. Following $\Phi_2$, the output 111 is isolated from the logic network 114. In effect, the field effect transistor 121 operates as a sampling transistor for logic gate 110 to permit the state of the logic network 114 to be sampled during the $\Phi_2$ interval.

During $\Phi_3$, the output 122 of logic gate 110 is precharged i.e. capacitor 119 is charged to approximately a $\Phi_3$ clock voltage level through load field effect transistor 123. The isolation field effect transistor 124 is also on during the $\Phi_3$ time for permitting the capacitance 125 at terminal 113 to be precharged. During $\Phi_4$, the logic network 112 is evaluated so that the output 22 changes to electrical ground at terminal 113' if the logic network is true or remains at approximately the $\Phi_3$ voltage level if the logic network 112 is evaluated as false.

Figure 6:
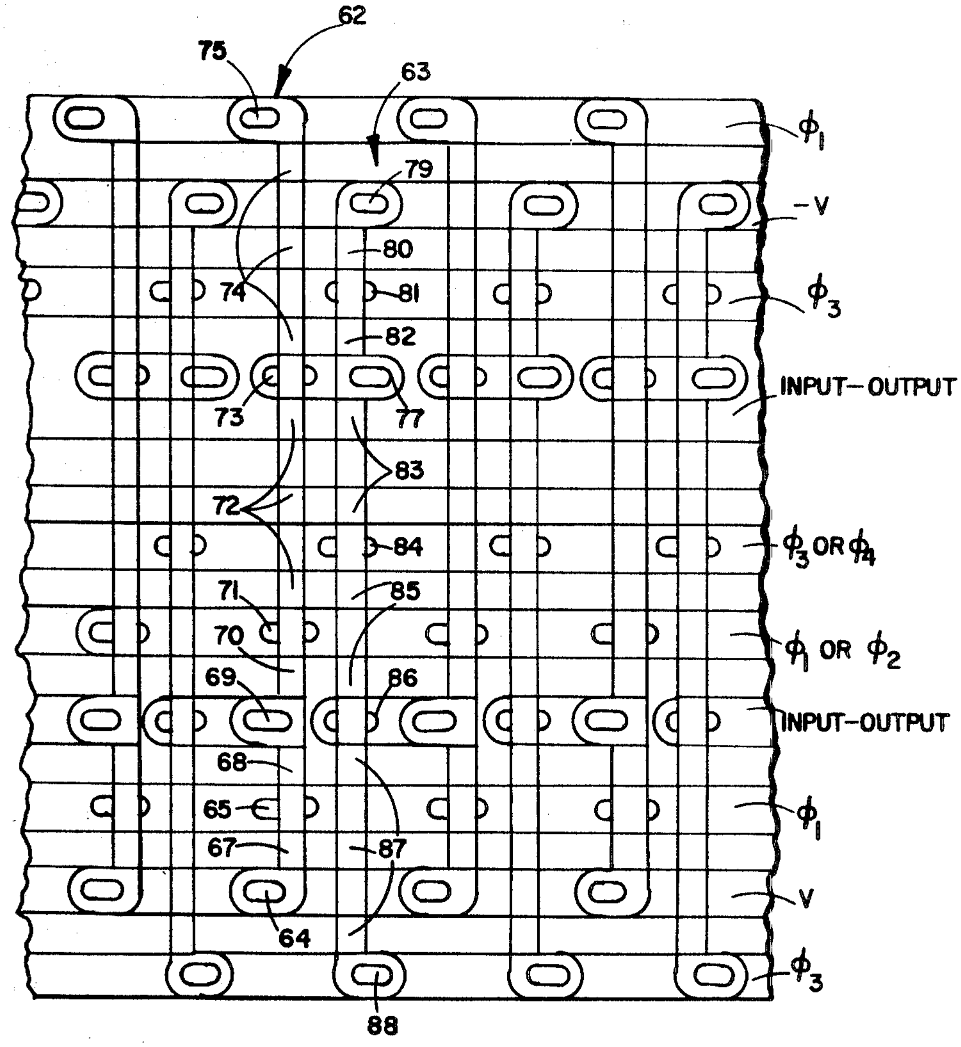
FIG. 6 is a representation of an actual shift register embodiment as it appears on the surface of a semiconductor chip embodying the shift register. The FIG. 6 embodiment uses a combination of Type I logic gates.

Referring now to FIG. 6, wherein is shown an actual representation of a portion of a multiple stage shift register formed on a silicon wafer. The representation shows eight half stages although for the purpose of this description, only two are utilized.

The schematic drawing of FIG. 2 is represented in FIG. 6 by gates 62 and 63 except that the gating signals for each are different.

Gate 62 is comprised of a terminal 64 which is connected to −V, a gate electrode 65 connected to $\Phi_1$, drain 67 between the gate electrode and terminal 64 and source 68 between the output terminal 69 and gate 65.

The horizontally striped areas are metal conductors comprised of, for example, aluminum. Where the conductors have circular areas therein, as shown in connection with each gate and each terminal, the metal has been deposited either to the diffused silicon material or to an insulating oxide layer for forming the devices comprising the gates. The vertically striped areas are diffused with impurities to form either a P- or N-type material. For the particular embodiment shown and disclosed, P-type material is not used. The metal conductors are deposited at intervals so that by selectively forming gates and terminals, field effect devices are produced. In forming a terminal, the areas where it is desired to have a conductor contact the diffused material, the oxide is etched through from the outside. Subsequently the metal is deposited in the etched opening so that it contacts the surface. The areas in between the terminals and the gate electrodes are drains or sources for the field effect devices. The gate electrodes are deposited on their oxide layer formed on the surface of the wafer. The areas underneath the gate electrode is not diffused with an impurity.

Gate 65 which is connected to $\Phi_1$ controls the conduction between the drain 67 and the source 68 to output terminal 69.

Gate 62 is further comprised of drain 70, gate electrode 71 which is connected to $\Phi_1$ or $\Phi_2$ and source 72. It should be noted that drain 70 is simultaneously the source 68 of the first field effect device and that source 72 is also the drain of the field effect device comprised of gate electrode 73 and source 74.

The field effect transistors having gate 73 is the logic function for gate 62. Gate electrode 73 serves as the input to the gate. Source 74 is also connected to terminal 75 which is connected to a source for resetting the output as a function of the input on gate 73. For the embodiment shown, 75 is connected to $\Phi_1$. When $\Phi_2$ is true, $\Phi_1$ is false and if the signals appearing at gate 73 is also true, the output capacitor is charged to ground.

Gates 63 includes the same components as gate 62 except that they are produced in reverse order. The only significance of the inverted arrangements of the gates is that it is easier to design and produce a system in that manner. Other embodiments are also possible.

Gate 63 comprises terminal 79 which is connected to −V, drain 80, gate electrode 81 which is connected to $\Phi_3$, and source 82 which is connected to the output terminal 77.

The source gate drain combination comprises a field effect transistor. Drain 83 which is continuous with source 82, gate of 84 connected to $\Phi_3$ or $\Phi_4$, and source 85 form a second transistor. The second transistor is described in connection with FIG. 2 as an isolation transistor.

Source 85 also comprises the drain for the transistor comprising the logic function for gate 63. The transistor also includes gate electrode 86 and source 87 which is connected to resetting terminal 88. The resetting terminal is connected to $\Phi_3$.

The shift register operates substantially the same as previously described in connection with FIG. 2. Whenever $\Phi_1$ is true, the output effective capacitance and the capacitance of the logic function (not shown) are charged toward the level of −V. Whenever $\Phi_2$ is true, and if the signal appearing at gate electrode 73 is also true, the output capacitance is charged to the level of $\Phi_1$, which is false. In the event the signal appearing at gate electrode 73 is false, the output capacitor (not shown) at output 69 remains true.

Whenever $\Phi_3$ is true, the output capacitor is precharged toward −V. Output 77 is connected as input 73 of gate 62 which is similar to input 86 of gate 63. Whenever $\Phi_3$ is true, −V charges the effective capacitor (not shown) of output 77 toward −V. Subsequently, when $\Phi_4$ is true, and if the signal appearing on the gate electrode 86 is true, the output capacitor is charged to ground. Output 77 is used as an input to input 73 of stage 62. The input to gate 63 is also the output from a previous stage. Therefore, it can be seen that if the output of a previous stage is true the the times that $\Phi_1$ and $\Phi_2$ are true, it will cause the transistor comprised of source 74, gate 73 and drain 72 to conduct and reset the output capacitor associated with output 69 to ground. All of the gates shown in FIG. 6 are similarly interconnected to each other.

While the principles of the invention have now been made clear in an illustrative embodiment there will be immediately obvious to those skilled in the art many modifications in structure, arrangement, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What I claimed is:

1. A multiple phase logic gate for shift register stages comprising a first stage having an output, a two terminal logical network comprising at least one field effect transistor having a control electrode, the signal on said control electrode determining the impedance of an electrical path from one terminal to the other, field effect transistor means and isolation field effect transistor means operable to conduct electrical current therethrough to one terminal of said logical network and to said output for simultaneously applying a voltage level to said one terminal of said logical network and to said output during a first phase recurring clock signal, said field effect transistor means operable to conduct electrical current therethrough only during said first phase recurring clock signal, means for applying a different voltage level to the other terminal of said logical network at least during a second phase recurring clock signal, said isolation field effect transistor means operable to conduct electrical current therethrough during said second phase recurring clock signal for connecting said one terminal to said output during said second phase recurring clock signal, and a second stage having a second output and comprising, a second two terminal logical network comprising at least one field effect transistor having a control electrode, the signal on said control electrode determining the impedance of an electrical path from one terminal to the other, a second field effect transistor means and second isolation field effect transistor means operable for simultaneously applying a voltage level to one terminal of said second logical network and to said second output during a third phase recurring clock signal, said second field effect transistor means operable only during said third phase recurring clock signal, second means for applying a different voltage level to the other terminal of said second logical network at least during a fourth recurring clock signal and said second isolation field effect transistor means operable for connecting said one terminal to said second output during said fourth phase recurring clock signal, said first recited output of the multiphase logical gating circuit comprising an input to a control electrode of said second two terminal logical network for forming one stage of a shift register.

2. The combination recited in claim 1 wherein said first recited isolation field effect transistor means is connected between said first recited output and a common point between said first recited field effect transistor means and said one terminal of the two terminal logical network.

3. The combination recited in claim 2 wherein said second output is connected to a common point between said second field effect transistor means and said second isolation field effect transistor means.

4. The combination recited in claim 1 wherein said second isolation field effect transistor means is connected between said second output and a common point between said second field effect transistor means and said one terminal of said second two terminal logical network.

5. The combination recited in claim 4 wherein said first recited isolation field effect transistor means is connected between said first recited output and a common point between said first recited field effect transistor means and said one terminal of the first recited two terminal logical network.

6. A logic gate for use as a shift register stage having an output and comprising, first, second, and third field effect transistors connected in electrical series between means for providing a first and a second voltage level, and a fourth field effect transistor connected between said output and a common point between said first and second field effect transistor, said first, second and fourth field effect transistors being rendered conductive and nonconductive as a function of multiple phase clocking signals applied to their respective control electrodes.

7. The combination recited in claim 6 and further including a second logic gate having an output and comprising fifth and sixth field effect transistors in electrical series, a two terminal logical network comprising at least one field effect transistor having a control electrode, the signal on the control electrode of the field effect transistor determining the impedance of an electrical path between the two terminals of the logical network, said fifth and sixth field effect transistors and said two terminal logical network being connected in electrical series between means for providing a first and a second voltage level, said output being connected to a common point between said fifth and sixth field effect transistors and providing an input signal to the control electrode of said third field effect transistor.

8. The combination recited in claim 6 and further including a second logic gate having an output and comprising fifth, sixth, and seventh field effect transistors in electrical series between means providing a first and a second voltage level, said second recited output connected at a common point between said fifth and sixth field effect transistors, said first recited output providing an input to the control electrode of said seventh field effect transistor.

9. A logic gate for use as a shift register stage having an output and comprising, first and second field effect transistors connected in electrical series, said output being connected at a common point between said first and second field effect transistors, a two terminal logical network comprising at least one field effect transistor having a control electrode, the signal on said control electrode determining the impedance between said two terminals, said two terminal logical network being connected in electrical series with said first and second field effect transistors between means providing a first and a second voltage level, a third field effect transistor connected in electrical series with the control electrode of one field effect transistor of said two terminal logical network for providing an input to said two terminal logical network.

10. The combination recited in claim 9 further including a second logic gate having an output and comprising a fourth field effect transistor, a second two terminal logical network comprising at least one field effect transistor, the signal on said field effect transistor determining the impedance between said two terminals, said two terminal logical network and said fourth field effect transistor being connected in electrical series between means providing a first and a second voltage level, said third field effect transistor being connected to a common point between said fourth field effect transistor and said second two terminal logical network whereby the output of said second logic gate is gated to said first logic gate when said third field effect transistor is conducting.